United States Patent
White et al.

(10) Patent No.: US 11,962,845 B1
(45) Date of Patent: *Apr. 16, 2024

(54) EVENT INFORMATION COLLECTION SYSTEM

(71) Applicant: United Services Automobile Association (USAA), San Antonio, TX (US)

(72) Inventors: Angelica N. White, Spring Branch, TX (US); Matthew C. Dahlman, Selma, TX (US); Brian Tougas, Spring Branch, TX (US); Gideon B. Luck, Wylie, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,456

(22) Filed: Apr. 12, 2023

Related U.S. Application Data

(63) Continuation of application No. 17/723,221, filed on Apr. 18, 2022, now Pat. No. 11,659,235, which is a continuation of application No. 17/037,459, filed on Sep. 29, 2020, now Pat. No. 11,336,955.

(51) Int. Cl.
| | | |
|---|---|---|
| *H04N 21/44* | (2011.01) | |
| *G01S 19/01* | (2010.01) | |
| *G06F 3/0482* | (2013.01) | |
| *G06F 16/73* | (2019.01) | |
| *G06V 20/40* | (2022.01) | |
| *H04N 21/4223* | (2011.01) | |
| *H04N 21/431* | (2011.01) | |
| *H04N 21/433* | (2011.01) | |

(52) U.S. Cl.
CPC ....... *H04N 21/44008* (2013.01); *G01S 19/01* (2013.01); *G06F 3/0482* (2013.01); *G06F 16/73* (2019.01); *G06V 20/41* (2022.01); *H04N 21/4223* (2013.01); *H04N 21/4312* (2013.01); *H04N 21/4334* (2013.01)

(58) Field of Classification Search
CPC ......... H04N 21/44008; H04N 21/4223; H04N 21/4312; H04N 21/4334; G01S 19/01; G06F 3/0482; G06F 16/73; G06V 20/41
See application file for complete search history.

(56) References Cited

U.S. PATENT DOCUMENTS

| | | |
|---|---|---|
| 10,631,147 B2 | 4/2020 | Matus et al. |
| 11,336,955 B1 | 5/2022 | White et al. |

(Continued)

*Primary Examiner* — John R Schnurr
(74) *Attorney, Agent, or Firm* — Potomac Law Group, PLLC; Dannon G. Allbee

(57) ABSTRACT

Methods and systems can identify and request video data and information associated with an event. An event location and time associated with the event can be determined. The event can comprise damage to property or injury to a person. A geographic range of interest associated with the event location and a time duration of interest associated with the event time can be determined. One or more users who are determined to have been at or near the event location at the event time can be automatically identified. A request for at least one of information or video data from the geographic range and time duration of interest can be transmitted to the one or more identified users.

20 Claims, 6 Drawing Sheets

(56) References Cited

U.S. PATENT DOCUMENTS

| | | | |
|---|---|---|---|
| 11,659,235 B1 * | 5/2023 | White | G06Q 50/18 |
| | | | 725/37 |
| 2014/0225719 A1 | 8/2014 | Kesavan et al. | |
| 2014/0300739 A1 | 10/2014 | Mimar et al. | |
| 2016/0275790 A1 | 9/2016 | Kang et al. | |
| 2018/0218753 A1 | 8/2018 | Hodge et al. | |
| 2018/0262694 A1 | 9/2018 | Lee et al. | |
| 2019/0058849 A1 | 2/2019 | Watanabe et al. | |
| 2020/0216026 A1 | 7/2020 | Price et al. | |
| 2020/0372792 A1 | 11/2020 | Li et al. | |
| 2021/0191999 A1 | 6/2021 | Chen et al. | |

* cited by examiner

EVENT INFORMATION COLLECTION SYSTEM

CROSS-REFERENCE TO RELATED APPLICATIONS

This application is a continuation of U.S. patent application Ser. No. 17/723,221, filed Apr. 18, 2022, which is a continuation of U.S. patent application Ser. No. 17/037,459, filed Sep. 29, 2020, now issued as U.S. Pat. No. 11,336,955 on May 17, 2022, both of which are hereby incorporated by reference in their entirety for all purposes.

TECHNICAL FIELD

This disclosure is directed generally to systems, methods, and apparatus for identifying and collecting recorded data that relates to an event.

BACKGROUND

Insurance companies process many vehicle and personal injury claims from accidents and events. For example, there are approximately six million vehicle accidents every year in the United States. Finding witnesses who viewed the accident and interviewing them is costly and time-consuming, and witness testimonies can be inaccurate. Furthermore, the purchase of police reports associated with accidents is expensive.

Video data and other recorded information of events often exists. Dash cameras and sensors that detect telematics data are generally inexpensive and easy to install. In addition, many people have a video-enabled smart phone that they use to film events. Video from events is often shared electronically via social networking applications and video websites.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
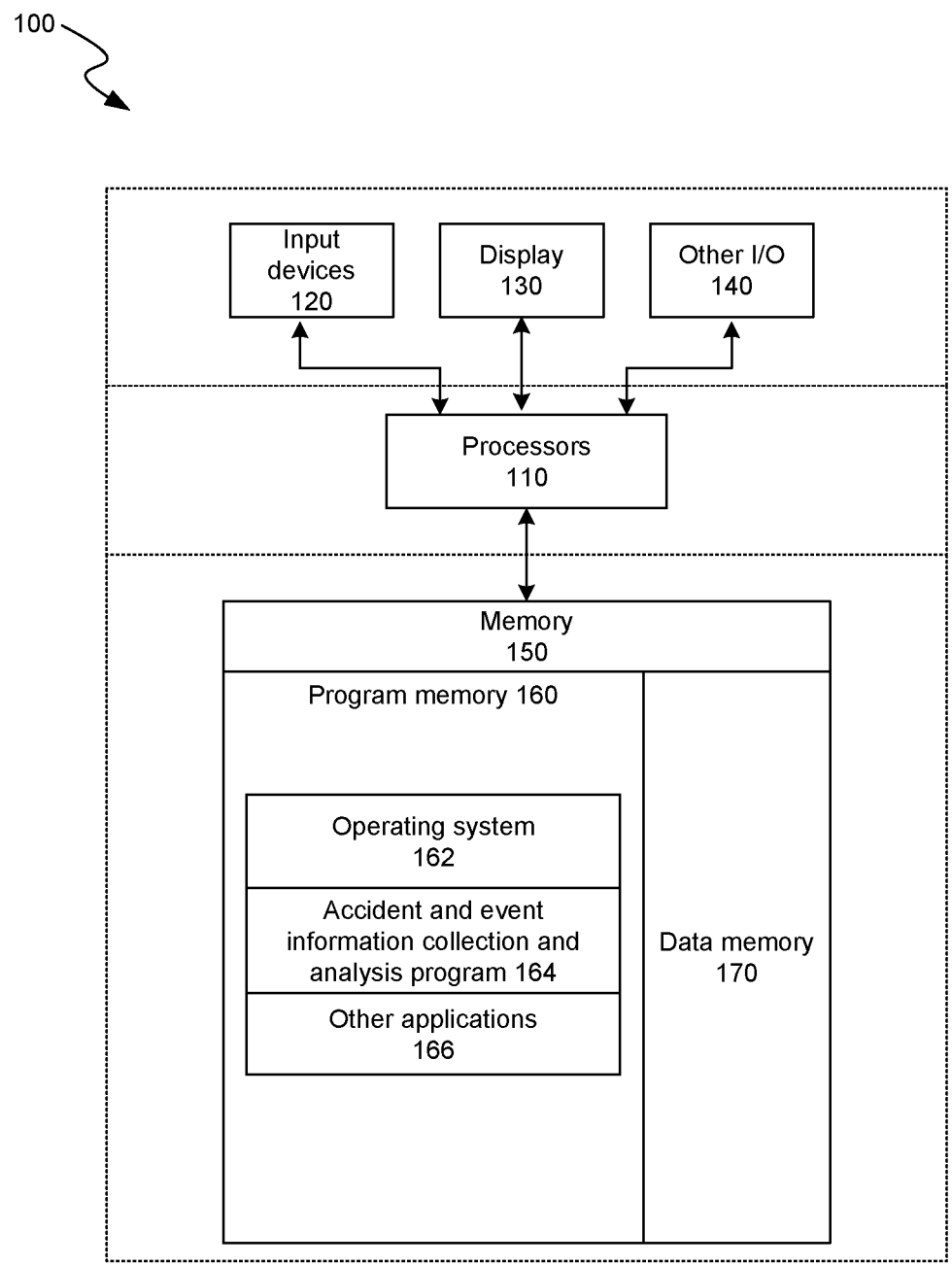
FIG. 1 is a block diagram illustrating an overview of devices on which some implementations of the disclosed technology can operate in accordance with various embodiments of the present disclosure.

Aspects of the present disclosure are directed to locating, identifying, and retrieving video data of an accident or other event that can be used to determine the circumstances of the event. When an event occurs, such as two vehicles colliding, it may be difficult to determine who was at fault. There may be contributing factors associated with the event, such as rate of speed, weather, obstacles such as traffic, pedestrians and bicyclists, etc. Sometimes a vehicle has a dash camera installed that shows one view of the event. Witnesses can be hard or impossible to locate as they drive by the scene without stopping. Some witnesses will have dash camera video data of the scene, while others may record video data on their phone. If available, this video data could help resolve the circumstances around the event. Technological advantages are realized as multiple views of an event, including information from before and after the event, can be helpful when resolving a dispute or determining the circumstances of the event.

In some embodiments, users can download an application onto their personal device that tracks their position (e.g., using global positioning system (GPS) data) and uploads their location information to a memory. When an event occurs, a location and time associated with an event can be determined, either by a person, GPS data, meta-data associated with video data, etc. From this, a geographic range of interest and a time duration of interest can automatically be determined. The memory storing many users' GPS data can be searched to identify a match with the event. For example, a user not involved with the event may have driven by the event and have applicable dash camera video data, or the uninvolved user may have been present in the area and filmed the event, either on purpose or inadvertently, such as in the background of another video. An entity can contact the user to ask if they have knowledge or video of the event. This provides a technological improvement by providing a new interface that can temporally and geographically tag recorded data and query against it to identify both people who may have witnessed an event and helpful video data to resolve disputes involving accidents and other events.

In other embodiments, an entity can identify the geographic range of interest and time duration of interest based on a location and time of an event. The entity can then search their own video database as well as others for a match. The entity can further search video websites, networks or aggregators (e.g., YouTube™, etc.), such as by reviewing meta-data associated with video data, to find a match. The entity can submit queries to other businesses that may acquire video data (e.g., fleet-based businesses, smart city infrastructure, etc.) to request video data based on the identified parameters. Furthermore, machine learning can be used to identify whether content in the video data corresponds to the event. This provides a technological improvement as video websites can have millions of posted videos, making it previously impossible for an individual to independently search for and review posted video data to locate a match with the event. However, the data aggregation system described herein, which can use video meta-data and machine learning to search these video websites for event data introduce this new technical ability to locate video matching an event.

In yet other embodiments, the application on the personal device can upload video data and other information associated with the event to the entity. The user may or may not be involved in the event, and the user may or may not be a member of the entity organization. The user can be offered an incentive to upload the video data and other data, improving the possibility that the entity will receive data that contributes to the resolution of, or clarifies circumstances related to, the event. A technological improvement is realized as automated video and other data submissions matching event characteristics can be forwarded to the entity in a timely manner (even in real-time), providing information that can eliminate the need to access alternate data sources (e.g., police reports, witness accounts, etc.)

Several implementations are discussed below in more detail in reference to the figures. FIG. 1 is a block diagram illustrating an overview of devices on which some implementations of the disclosed technology can operate. The devices can comprise hardware components of a device 100 that can receive video data, record video data, and/or provide information associated with an accident or event to another entity in various formats (e.g., text, audio, video, etc.). Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device 120 and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory 150 includes one or more of various hardware devices for volatile and non-volatile storage, and can include both read-only and writable memory. For example, a memory 150 can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, an accident information collection and analysis program 164, and other application programs 166. The accident information collection and analysis program 164 can identify users and vehicles who are likely involved in an event or near an event, and request video data and other information associated with the event. Memory 150 can also include data memory 170, e.g., such as data files, video data which may be stored as video files, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, artificial reality systems, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
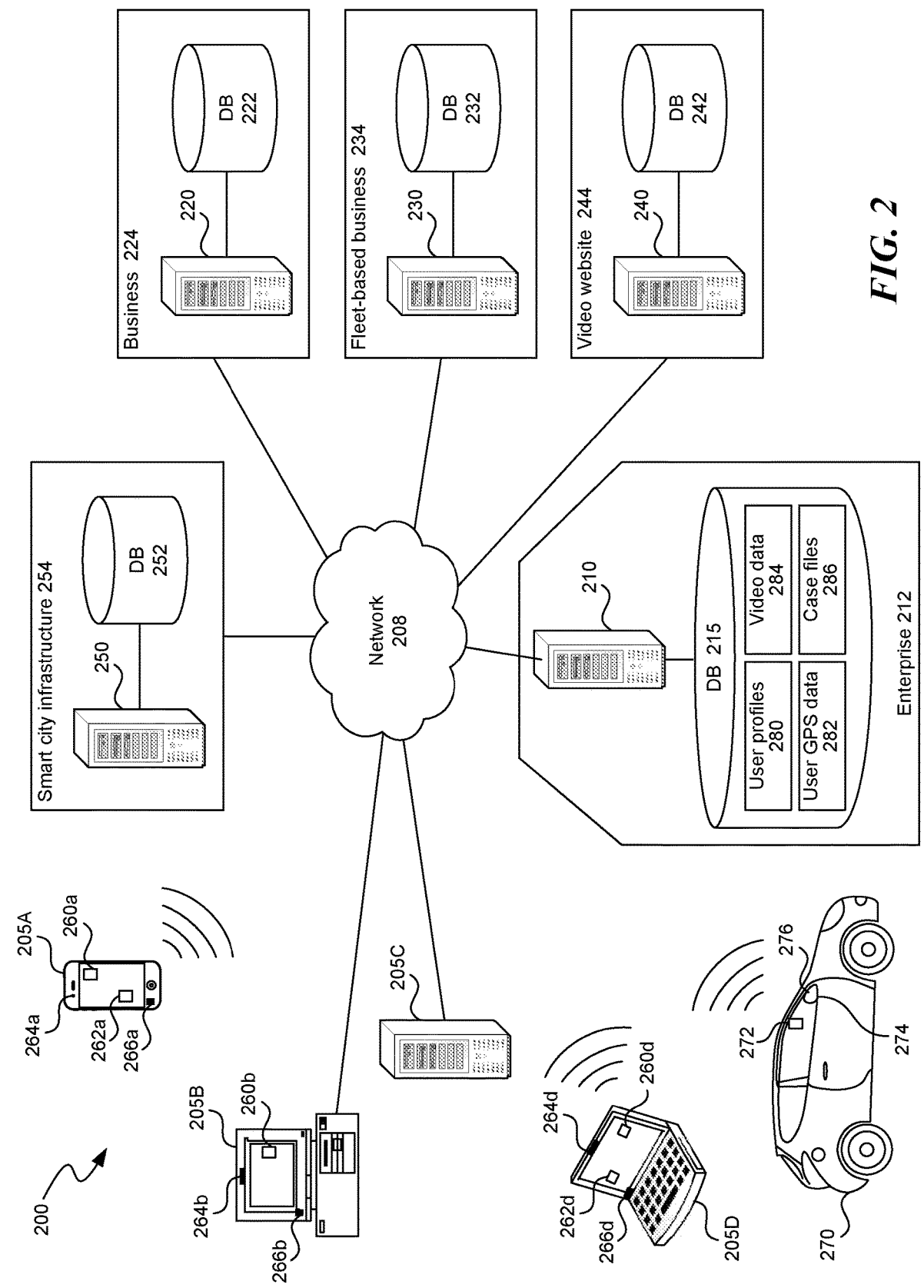
FIG. 2 is a diagram illustrating an overview of an environment in which some implementations of the accident or event information collection and analysis technology can operate in accordance with various embodiments of the present disclosure.

FIG. 2 is a diagram illustrating an overview of an environment 200 in which some implementations of the accident and event information collection and analysis technology can operate. Environment 200 can include one or more user computing devices (e.g., user devices) 205A-D, examples of which can include device 100 of FIG. 1. The user devices 205 can operate in a networked environment using logical connections through network 208 to one or more remote computers, such as a server computing device 210.

In some implementations, server 210 can be an edge server within an enterprise 212 which receives client requests and coordinates fulfillment of those requests through other servers (not shown). Server computing device 210 can comprise computing systems, such as device 100. Though the server computing device 210 is displayed logically as a single server, server computing devices can each be a distributed computing environment encompassing multiple computing devices located at the same or at geographically disparate physical locations. In some implementations, the server 210 corresponds to a group of servers.

The user devices 205 and server computing device 210 can each act as a server or client to other server/client devices. Server 210 can connect to a database 215 that can warehouse (e.g., store) information such as user profiles 280, user global positioning system (GPS) data 282 associated with user devices 205 and vehicles 270, video data 284 transmitted to and/or requested by the enterprise 212, and case files 286. One or more case files 286 can be created based on the event and may be linked to a user in the user profiles 280 and/or one or more files in the video data 284. Though database 215 is displayed logically as a single unit, database 215 can be a distributed computing environment encompassing multiple computing devices, can be located within its corresponding server, or can be located at the same or at geographically disparate physical locations.

Servers 220, 230, 240, and 250 can each be associated with a different entity as discussed further below, and connect to a corresponding database 222, 232, 242, and 252. As discussed above with respect to server 210, each of the servers 220, 230, 240, and 250 can correspond to a group of servers, and each of these servers can share a database or can have their own database. Databases 222, 232, 242, and 252 can also warehouse information similar to the database 215, along with other data specific to the particular entity. Additionally, although databases 222, 232, 242, and 252 are displayed logically as single units, the databases 222, 232, 242, and 252 can be a distributed computing environment encompassing multiple computing devices, can be located within their corresponding server, or can be located at the same or at geographically disparate physical locations.

The network 208 can be a local area network (LAN) or a wide area network (WAN), but can also be other wired or wireless networks. Network 208 may be the Internet or some other public or private network. User devices 205 can be connected to network 208 through a network interface, such as by wired or wireless communication. The connections between the servers 210, 220, 230, 240, and 250 are shown as separate connections, and these connections can be any kind of local, wide area, wired, or wireless network, including network 208 or a separate public or private network.

In general, the technology described herein can gather or facilitate queries on data for "events" which can include, e.g., a traffic or other type of accident, damage to vehicles, damage to other property, injury to persons, criminal activity such as vandalism and theft, traffic conditions, police activity, weather conditions such as storms, and the like. The enterprise 212 may be a business such as an insurance company that insures automobiles, other property, people, etc., a private or public security agency, a social event organizer, a weather or news service, etc. The enterprise 212 can collect data from users who are members, users who are nonmembers, as well as other witnesses to an event, according to member agreements, member privacy settings and agreements, policy, etc. Event data, such as member and witness statements, associated pictures, police reports, audio recordings, and video data acquired by dash cameras, personal user devices 205, and security cameras can be stored in the database 215.

A user can be a member of the enterprise 212, such as by paying for auto insurance through the enterprise 212. The user can be associated with one or more of the user devices 205 that can include an application 260a, 260b, or 260d associated with the enterprise 212. One or more of the user devices 205 can also include GPS 262a or 262d (or other location services) for tracking the location of the associated user device 205a or 205d, a camera 264a, 264b, or 264d and a microphone 266a, 266b, or 266d. The application 260 may include functionality for reporting event information and uploading associated video data and location tracking data acquired by the GPS 262 to the enterprise 212. In some cases, the application 260 may also include additional functionality such as monitoring claim status, banking, paying bills, etc. In some embodiments, the user may not be a member of the enterprise 212, but may download the application 260 to provide event data to the enterprise 212, e.g., to receive another incentive or to access other features of the application 260.

The enterprise 212 may offer or provide a financial incentive to the users, either members or nonmembers, to allow the enterprise 212 to conduct location tracking of the device 205 and/or provide a financial incentive after the user has uploaded event data that is associated with an event of interest. For example, users can be incentivized to provide their video data to the enterprise 212 with money, gift cards, discounts, electronic credits, etc. The user can choose to provide their video data to help resolve complaints of other users of the enterprise 212. Additionally, the video data may be used by other businesses or entities, anonymously or with their knowledge, to resolve complaints/events and thus a technical advantage of identifying witnesses and collecting relevant video, audio and/or text data is accomplished without having to laboriously attempt to locate witnesses and collect their statements. The provision of recorded data may be conditioned on user consent to each upload or to uploads generally and may be secured with other privacy filters such as removing personally identifiable information ("PII"), disabling recording in certain locations (such as the user's home, in restrooms, other designated areas), automatically deleting data not associated with an event within a threshold time period, etc.

The application 260 can be configured to receive data, input by the user, that is associated with an event. The event may be experienced by the user, occur proximate to the user, or be experienced by or near the user's vehicle or other property. The enterprise 212 can send messages to the user through the application 260 to request data (e.g., text, audio, and/or video) associated with an event.

The user can have an associated vehicle 270 (which may be insured through the enterprise 212, may belong to another organization such as a delivery or chauffeur service, or may be a private and unaffiliated vehicle). The vehicle 270 can have a dash camera 272 or other sensors (e.g., sonar, time-of-flight object detection, depth camera, etc.) installed therein. While the description below generally refers to event data being gathered by cameras, in each case other data (such as audio, visual, 3D modeling, etc. data) can be gathered by other environment capture devices. In general, the dash camera 272 can be configured to acquire video data, and in some cases audio data, when the vehicle 270 is turned on. In some cases, the dash camera 272 can sense movement around the periphery of the vehicle 270 and will record video and/or audio data when the vehicle 270 is turned off. The dash camera 272 can have an integrated GPS or other location services for identifying location information such as latitude and longitude, coordinates, and the like that can be stored in the meta-data of acquired video footage or other recorded data. The dash camera 272 can also store a date and time of day (e.g., time data) in the meta-data of the acquired video footage. The dash camera 272 can transmit video data to the user device 205 wirelessly or via a cable. In some cases, the dash camera 272 can be configured to wirelessly transmit acquired video footage to a web address, such as the enterprise 212, automatically or upon command (e.g., such as via a transponder 274). In some cases, a separate GPS 276 may be installed within the vehicle 270, and may be integrated with one or both of the dash camera 272 and the transponder 274.

The transponder 274 or other device may also convey telematics data associated with the vehicle 270 to the enterprise 212. Telematics can include location, speed, including sudden changes due to acceleration and braking, and the like. In some cases, the enterprise 212 may use the telematics data when determining a probability of fault for the event.

It is often advantageous to have multiple views of an accident or other event to provide additional camera angles and data, and the enterprise 212 can have many users who participate in the reporting of event data. Therefore, it is possible that when an accident or other event is experienced by a first user, a second user (or multiple users) may be in the general area and have recorded video data of the accident or event with their dash camera or their user device 205. For example, the enterprise 212 can determine, via uploaded GPS tracking data, that the second user was in the vicinity of the event and request, via the application 260, any data they may have with respect to the event, including, in some cases, prior to the event. Accordingly, multiple video files of video data can be stored in the database 215 and analyzed by the enterprise 212 while investigating the event. In some implementations, these video files can be stitched together to provide a cohesive view of the event. For example, overlaps can be determined for video segments having the same time indexes (where time indexes can be based on meta-data or identified co-occurrences of events in the videos), allowing the videos to be combined to show a larger view of the event or views of the event from different angles. In some cases, the files can be used to create a 3D view of the event, using the video data to fill in parts of the 3D model. For example, known libraries (e.g., that use machine learning) that transform video data into depth data can be used to generate a 3D model from each video. The color data can then be skinned onto the 3D models. The 3D models can be synchronized in time (similarly to the video stitching process), overlapping portions can be identified, allowing the models to be combined to show a larger virtual environment in which the event took place and detailing actions of the event.

In another example, the second user may have been traveling in a vehicle that has a dash camera, and can facilitate the notification and transmission of the video data to the enterprise 212. The enterprise 212 may work directly with the other driver as a witness, and/or request the video data from their dash camera, or if they are driving for a ride-share or taxi service, request the video data from the appropriate entity. Therefore, a technical advantage is provided as witnesses can be more easily identified, and video data and witness statements can be collected in a timely manner.

The server 210 of the enterprise 212 can facilitate communication with servers 220, 230, and 250 that are associated with other businesses and/or utilities. For example, a competing insurance business 224 may acquire video data associated with their members' vehicles and property, and may have access to dash camera video data and/or GPS data, which may be stored in the database 222. In other embodiments, the business 224 can be a different branch or location of the enterprise 212, or an entity related to the enterprise 212. Also, a fleet-based business 234, such as package delivery, taxi, or ride-share, may track many vehicles through GPS and/or planned routes and acquire video data with dash cameras. The fleet-based business 234 can store some or all of the video data acquired by their vehicles in a memory or the database 232. Smart city infrastructures 254 (e.g., networked cameras positioned to record video data associated with roads, intersections, buildings, etc.) can also acquire and store video data in the database 252.

In some embodiments, the enterprise 212, business 224, fleet-based business 234 and smart city infrastructure 254 may find it advantageous to share video data under certain circumstances, and video data may be made available for download or by request. For example, litigation is very expensive and fault for an accident or event may be determined based on one or more video files of video data. Also, although police reports are helpful in some cases, the cost of procuring the police reports can be prohibitive and are limited to witnesses who contribute to the police report.

The server 210 of the enterprise 212 can also communicate with the server 240 associated with a video website/network/aggregator 244. Many websites and services provide millions of videos uploaded by users and are generally referred to herein as video websites 244. For example, people upload videos that show accident and event data to YouTube™, Facebook™, Twitter™, Instagram™ and others. The video data can include meta-data that has associated location data and time data (e.g., date and time of day) of when the video data was acquired.

The server 210 of the enterprise 212 can determine a location and a time associated with the accident or event, and then determine parameters defining a geographic range of interest and a time duration. The parameters of geographic range of interest and the time duration may be based at least in part on the location of the event, and may also depend upon time of day, such as whether the event occurred in the dark, when the sun was setting or rising, etc. For example, if the accident occurred within a certain intersection, the location may be identified as the intersection or an address (e.g., intersection of Second Avenue and Pine, 201 Pine, etc.). The server 210 can then determine a geographic range of interest, such as a one-block radius around the identified location and a time duration of interest that starts before and ends after the time of the event, such as by requesting data that is two minutes before the event through five minutes after the event. If the event occurred on a highway, however, the enterprise 212 may determine a geographic range of interest that includes a half-mile radius around the event site, e.g., to obtain data from cars traveling near the event and traveling the other direction, on a separate road, or on a frontage road.

In some embodiments, the event may have been experienced by a parked vehicle, such as a broken window or damage sustained from another vehicle. In some cases, the server 210 may search for and/or request video data from a longer period of time, such as a duration of one or two days, if the exact time of the event is not known. For example, the user may be associated with the enterprise 212, but may not have a dash camera in the associated vehicle, or the dash camera may malfunction, not be powered, or may not capture relevant video data. Therefore, the server 210 can search a range of video data and submit requests that may provide information to resolve the event. In some implementations, the system can automatically analyze the video, e.g., to identify amounts of movement or using machine learning trained to identify certain activities such as an accident or burglary, and discard video that does not depict such events.

In some cases, the business 224 and fleet-based business 234 may transmit the video data to the enterprise 212 over the network 208 upon request. If the server 210 of the enterprise 212 identifies any videos that are publicly shared on one of the video websites 244, the server 210 may initiate a copy of the video data from the video website 244 over the network 208. The server 210 may attempt to identify video data acquired by the smart city infrastructure 254 or submit a request to the server 250 that includes the geographic range of interest and the time duration.

Figure 3:
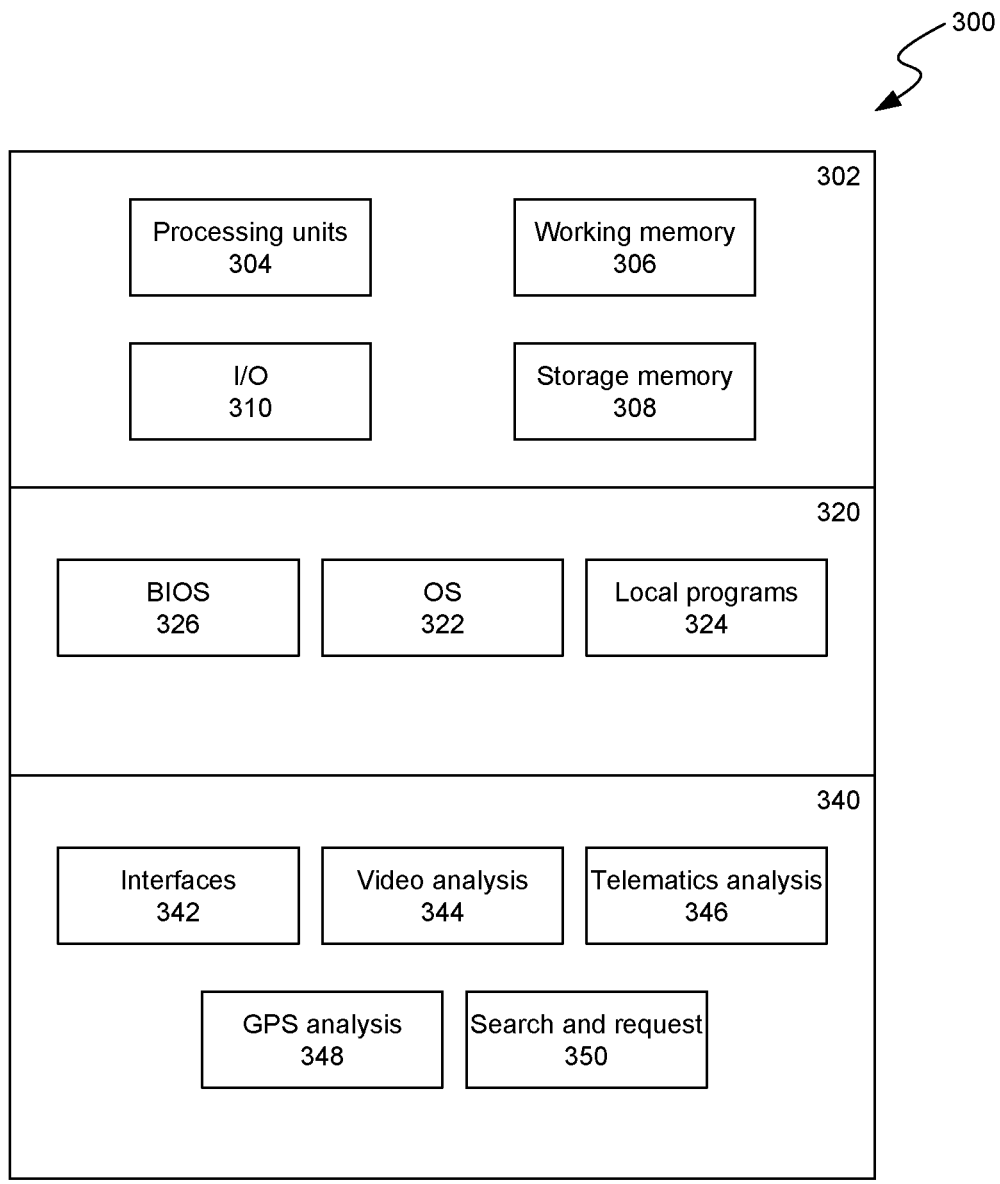
FIG. 3 is a block diagram illustrating components which can be used in a system employing the disclosed accident or event information collection and analysis technology in accordance with various embodiments of the present disclosure.

FIG. 3 is a block diagram illustrating components 300 which, in some implementations, can be used in a system employing the disclosed accident information collection and analysis technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as database 215, 222, 232, 242, or 252), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as database 215 or storage provided through another server 220, 230, 240 or 250). Components 300 can be implemented in a client computing device such as user devices 205 or on a server computing device, such as the server computing device 210, 220, 230, 240 or 250.

General software 320 can include various applications including an operating system 322, local programs 324, and a basic input output system (BIOS) 326. Specialized components 340 can be subcomponents of a general software application 320, such as local programs 324. Specialized components 340 can include video analysis block 344, telematics analysis block 346, GPS analysis block 348, search and request block 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

The video analysis block 344 can analyze video data to identify accidents, vehicles, people, license plates, traffic conditions, speed, weather, etc. Additional details on analyzing video data are discussed below in relation to block 418 of FIG. 4. The telematics analysis block 346 can analyze telematics data uploaded by vehicles 270 and users to identify data associated with an event. Additional details on analyzing telematics data are discussed below in relation to block 402 of FIG. 4. The GPS analysis block 348 can identify users and vehicles 270 that may be located near an event and request data, and can also use the information to precisely identify the location and time of events. Additional details on identifying user and vehicles are discussed below in relation to block 508 of FIG. 5. The search and request block 350 can interface with businesses and other entries (e.g., 224, 234, 244 and 254) to locate, request and transfer data. Additional details on interfacing with businesses etc. to search for data are discussed below in relation to block 406 of FIG. 4.

The blocks 344, 346, 348, and 350 can each be implemented fully and/or partially using machine learning. A machine learning model can be trained with supervised learning, where the training data can include video as input to the machine learning model, where the video is tagged with identifications of people and property, such as vehicles and buildings, data that specifies a location and/or time, vehicles, license plates, witnesses, additional damage to area, whether particular events are depicted in the video (e.g., whether it depicts an accident), etc., which can be compared to output of the model to adjust model parameters, thereby training the model. In various implementations, this training data can be manually tagged by humans, can be based on known events (e.g., using video submitted for previous insurance claims), etc. A representation of damage to vehicle, for example, can be provided to the model. Output from the model can be compared to the desired output that shows collision data and, based on the comparison, the model can be modified, such as by changing weights between nodes of a neural network or parameters of the functions used at each node in the neural network (e.g., applying a loss function). After applying each of the weights and/or parameters in the training data and modifying the model in this manner, the model is trained to evaluate new video files and video data to identify whether event data related to vehicular damage or an event involving a vehicle is present. Therefore, machine learning can be used to identify whether content in the video data corresponds to the event.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
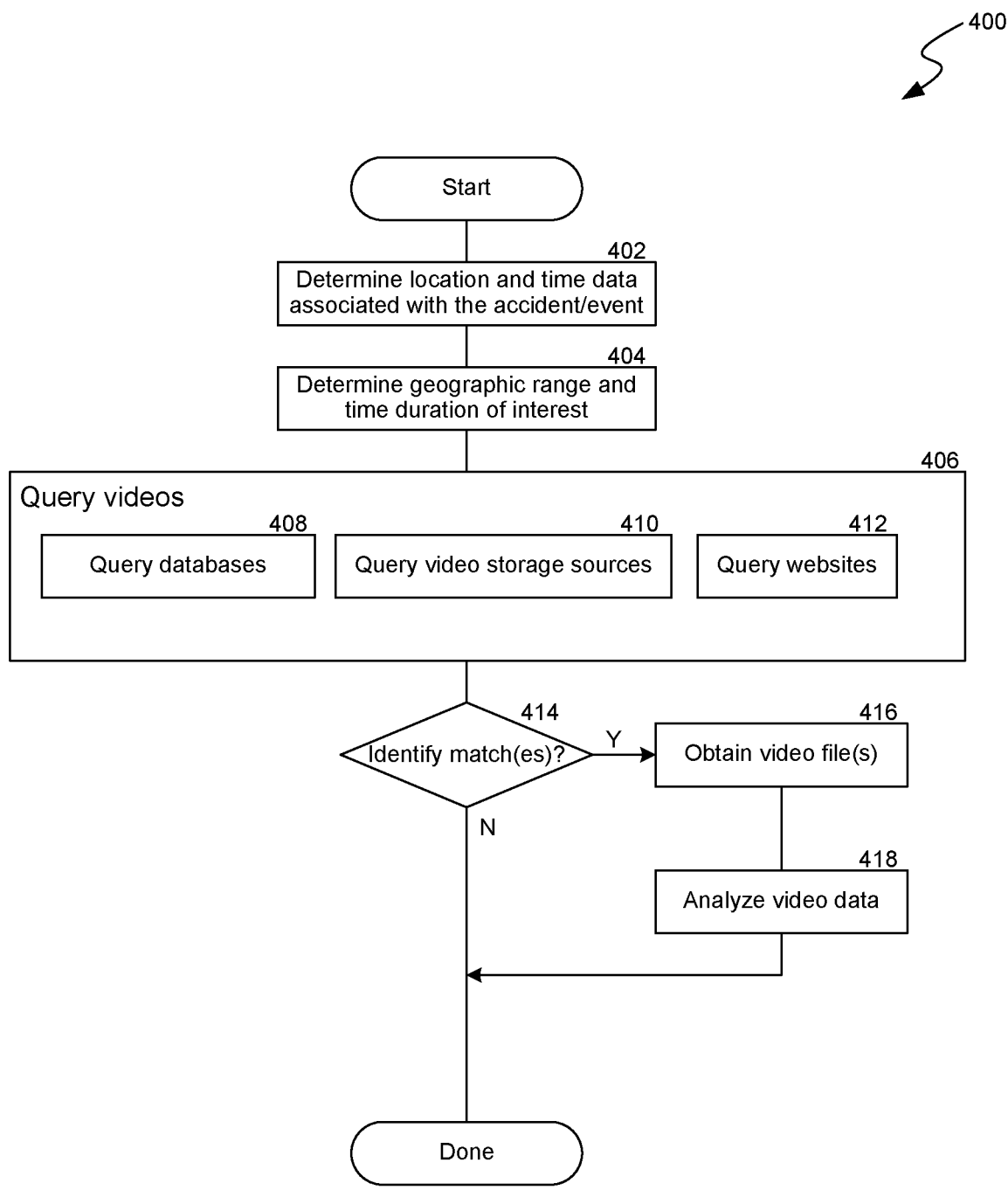
FIG. 4 is a flow diagram illustrating a process for querying storage sources in search of video data that corresponds to an event in accordance with various embodiments of the present disclosure.

FIG. 4 is a flow diagram illustrating a process 400 used in some implementations for searching video websites, video databases, and/or other storage sources, as well as querying video storage sources in search of video data that corresponds to an event. In some implementations, process 400 can be performed "just in time," e.g. as a response to a request from the enterprise 212 for video data corresponding to an identified event. For example, a triggering event may be a user calling and reporting an event to the enterprise 212 or reporting an event through the application 260. In some implementations, the process 400 can be performed on a schedule or when servers are determined to have available processing capacity.

At operation 402, process 400 can determine the location and time data associated with the event, which may also be referred to as a "triggering event". In some cases, the location and time data may be provided by the user (e.g., through the application 260, phone, text, email, etc.) or may be determined by analyzing telematics associated with the vehicle 270 in the accident, while in others cases it may be determined from the meta-data of video data recorded by the dash camera 272.

Process 400 can determine, at operation 404, a geographic range of interest (e.g., geozone) associated with the location and a time duration of interest associated with the time data. As discussed above, the geographic range and time duration may be based at least in part on the type of location where the event occurred and time of day when the event occurred. Process 400 may utilize mapping software and other data that may indicate density of the area, etc. The geographic range of interest and the time duration of interest can be used to generate query parameters for querying internal and external databases, websites and other businesses (e.g., such as businesses and entities 224, 234, 244 and 254 of FIG. 2). For example, if the general or specific time of an accident is known, either from a user report or a police report, the time duration may be short. If the timing of the event is not known, such as when a parked vehicle is damaged overnight, the time duration of interest may extend over a period of hours to search for video data that may show how and when the damage occurred.

At operation 406, process 400 can query for videos that match the query parameters determined at operations 402 and 404. Such queries can be executed against one or more video databases, video storage sources, or video aggregation websites or services. For example, at operation 408, process 400 can run the query against one or more video databases. For example, the enterprise 212 may first query an internal database, such as the database 215, to look for a match. The enterprise 212 may search meta-data stored with the video data, for example. Process 400 can also query other databases, such as the database 232 of the fleet-based business 234 and the database 222 of the business 224. In some cases, the businesses 224 and 234 may be entities with which the enterprise 212 has reciprocal agreements. In some embodiments, the enterprise 212 may offer an incentive to the businesses 224 or 234 and/or the user associated with the video data stored by the businesses 224 or 234 for access to the video data and/or when a match is identified.

In some implementations, process 400 can order queries such that querying stops when sufficient videos are located. If searching is to continue, at operation 410 process 400 can query other video storage sources, such as video website 244. For example, the server 210 may issue an application programming interface (API) call that defines the location and time data for the search, e.g. to the smart city infrastructure 254. If searching is to continue further, at operation 412, process 400 can submit queries to one or more website or video aggregation entities such as YouTube™. In some implementations, this can be accomplished to an API provided by the service or through an automated script that interfaces or scrapes data directly from the frontend of the website. In the case of searching an entity such as the smart city infrastructure 254 or YouTube™, it may be possible simply to copy the video data to the database 215 when any match is located. In some embodiments and in any of the queries of FIG. 4, the query may be defined such that if video data partially fulfills the request, such as a video file that includes portions of the geographic range of interest and portions of the defined time duration of interest, the video file can be identified as a match or hit.

At operation 414, process 400 can determine whether a match to the query parameters has been identified, i.e., if any videos are returned from the queries that match the determined location and geographic range. If so, process 400 can continue to block 416, if not, process 400 can end.

If any video files are identified at operation 406 which are not locally available, process 400 can obtain a copy of the video(s) at operation 416. For example, a smart city infrastructure 254 may transmit the video data to the enterprise 212 upon request or the video may be downloaded from YouTube™. Obtained video data can be stored, for example, in the database 215. In some cases, a link may be provided to the video data 284 from the associated case file 286 and the video data 284 may be marked for retention. In some embodiments, the video files of interest may be stored in a separate, secure location or database to prevent deletion.

If a match is identified and the video has been obtained, process 400 can analyze the video data at operation 418. In some embodiments, machine learning may be used to determine whether the video data includes information relative to the event. For example, specific details of the event, identities of people or vehicles involved, severity of the event, trajectories of objects leading up to the event, weather, nearby activity such as traffic, crowds, pedestrians, bicycles, etc. In some cases, various of these event characteristics can be determined by a machine learning system trained (as discussed above) to identify such characteristics, using input video data tagged with the desired features for comparison to the model output. In some cases, some identified video data may be reviewed by a representative, and findings of quality may be used to adjust the machine learning used to analyze the video data. In some embodiments, a representative of the enterprise 212 may review and/or analyze the video data. Process 400 can then end.

In some embodiments, the enterprise 212 may continue to search different video data sources to look for video data associated with the event. In other embodiments, after one or more video files are located, the process may halt or pause until a representative of the enterprise 212 or the server 210 confirms that the process is complete or directs the search to continue.

The above process provides the technical advantage of automatically identifying video files (e.g., video data) that can assist in an investigation of an accident or other event, while not relying on witness statements or cooperation of witnesses to provide video data. Witnesses can be impossible to locate, and some may not want to be involved. This process locates the associated video data quickly and allows users to submit information in a manner that can protect their privacy and/or earn a reward.

Figure 5:
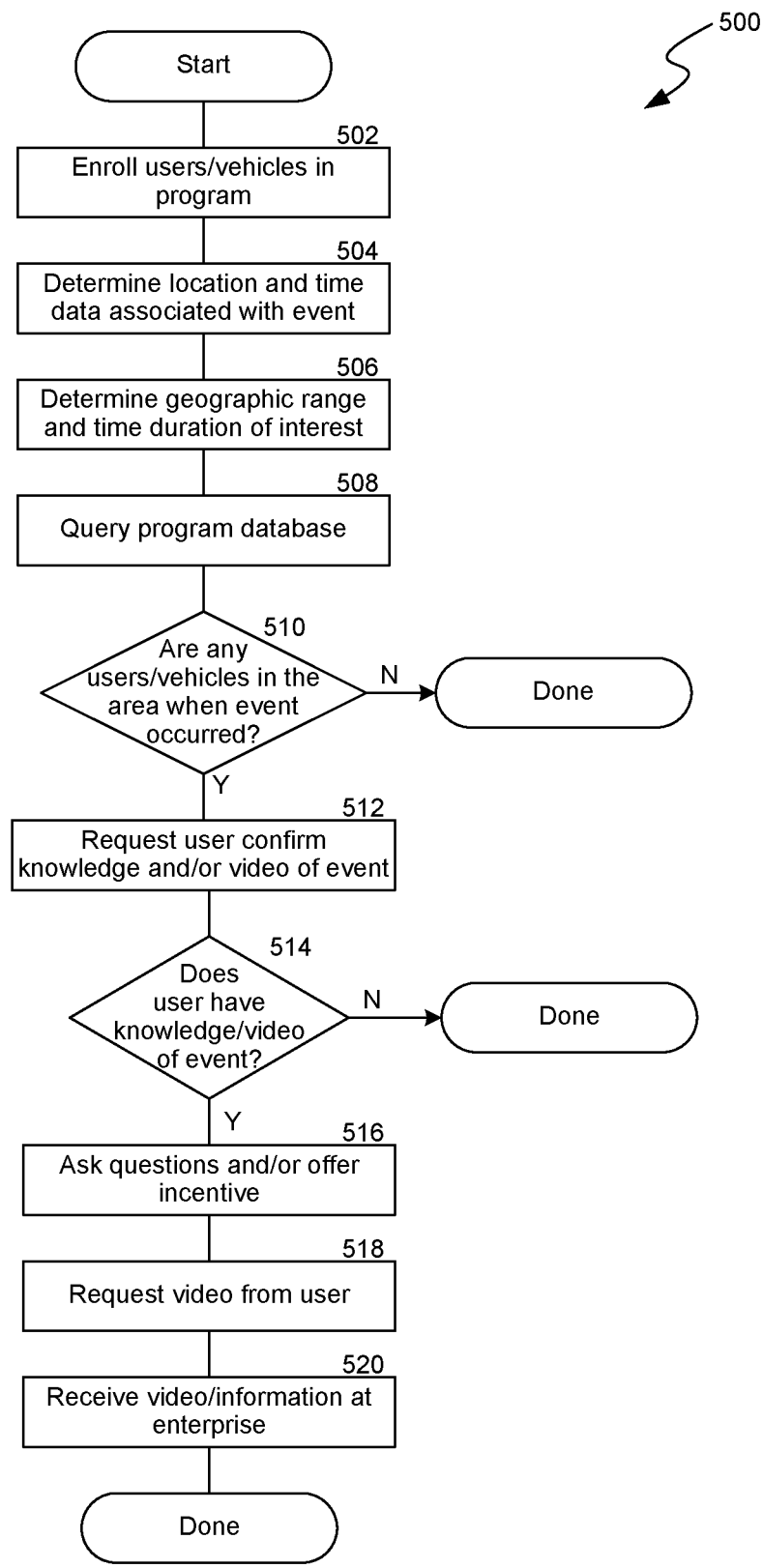
FIG. 5 is a flow diagram illustrating a process for identifying users who may have video data or other knowledge of an event in accordance with various embodiments of the present disclosure.

FIG. 5 is a flow diagram illustrating a process 500 used in some implementations for identifying users who may have video data or other knowledge of the event in accordance with embodiments of the present technology. For example, when an event is reported to the enterprise 212, the server 210 can determine if any users were near by and request information, including video data, from them. In some implementations, process 500 can be performed by server 210 or application 260.

At operation 502, process 500 can enroll user devices 205 and/or vehicles 270 in a program that records location and time data (e.g., GPS data). For example, users can be enrolled in a program that tracks the location of the user device 205 through the application 260. Similarly, a vehicle 270, such as one insured by the enterprise 212, can be tracked via telematics and may also be tracked using the GPS 276 that may periodically transmit data to the enterprise 212. The data can be transmitted to the enterprise 212 by the application 260, dash camera 272, transponder 274 and/or GPS 276 periodically, such as every few minutes, every hour, once a day, and/or as a result of a triggering event (e.g., a pattern of telematics that matches an accident event).

At operation 504, process 500 can determine the location and time data associated with the event as discussed above. For example, a user may have called the enterprise 212 or used the application 260 to report the event, which may be stored in the case files 286. At operation 506, the server 210 can determine the geographic range of interest and the time duration of interest as discussed previously. At operation 508, the server 210 can query the database 215 or other data store to search the user GPS data 282 of user devices 205 and/or vehicles 270 that may have been present at or near the event.

If, at operation 510, process 500 determines that no user devices 205 and/or vehicles 270 meet the search parameters, the process may terminate.

However, if process 500 determines at operation 510 that at least one user and/or vehicle 270 may have been present based on the defined parameters, at operation 512 process 500 can automatically generate a request that is sent to the user to ask if they know of the event and/or may have associated video data. For example, the user can be asked one or more questions to confirm whether the user was a witness to the event. The request can be a message sent via the application 260, a text message, an email, voicemail or call generated via an automated call system, or a written request sent or mailed through a postal system to a physical or postal address. In some embodiments, process 500 may format a request that is automatically sent to a customer service representative. In some cases, the representative may attempt to contact the user within a short time period, such as within 24 hours. In another embodiment, the representative may contact the user after a longer period of time, such as seven days, if the user has not responded to other electronic and/or written requests. In some implementations, the user may have pre-authorized access to event data, in which case block 512 can be skipped.

If the user reports at operation 514 that they have no knowledge and no video data of the event, the process can terminate. For example, the user may have been traveling through the area in a bus or using transportation other than their vehicle 270 and not be aware of the event. Alternatively, the user may have been present in the general area, but be unaware of the event. In some implementations, the system can automatically determine whether there is any recorded data from the time and location of the event, which can be reported as part of the query at block 510—where process 500 only continues to block 512 if such data was recorded.

If the user confirms at operation 514 that video data exists or may exist, and/or they have personal knowledge of the event, at operation 516, process 500 can, (e.g., via application 260) and/or a representative can initiate an interactive request for information. Such a request can present a series of questions and/or offering incentives to the user to review and/or provide available video data, and/or provide additional information about the event. For example, a statement can be requested from the user, as well as photos and/or video that may have been taken of the event by the user device 205 or a device known to the user (e.g., a dependent's or family member's device, a friend's device, etc.). In some cases, the user and their user device 205 may have been in the general area, but otherwise occupied, such as in a restaurant or theater, and have no personal knowledge of the event. Their dash camera 272, however, may have recorded video data.

The user can input and/or provide their information, can identify if they were traveling in their vehicle 270 and confirm whether dash camera footage exists. If the user was traveling in another vehicle, such as a bus, rideshare vehicle or another person's vehicle that is known to the user, they may be able to provide data to the enterprise 212 that will help the enterprise 212 contact others (e.g., ride share company, transportation company, associate of the user, etc.) who may have knowledge or video data of the event.

At operation 518, process 500 may request that the user upload the video data. For example, the video data may be transferred, such as through a cable or wirelessly, from the dash camera 272 to the user device 205. The user may then upload the video data using the application 260, a website, email, a text, etc. In other embodiments, if the dash camera 272 has the capability, the dash camera 272 may be enabled to automatically upload video data to a desired web location, such as when within a designate Wifi connection or when commanded to by the user.

In some embodiments, the enterprise 212 may offer an incentive to the user for providing the information. In some cases, the user may be offered an additional incentive for uploading the video data. In other cases, if the user confirms that video data does not exist (e.g., dash camera 272 was not on, video data has been overwritten, etc.) or that the video data does not provide any footage of the event, the user may still be eligible to receive an incentive. It should be understood that the process can offer the incentive at any time. For example, process 500 may offer the incentive as soon as the user is contacted, to encourage the user to share useful information. In some embodiments, a larger incentive may be offered if the user responds within a predetermined amount of time, such as 1, 5, 24, or 48 hours, to encourage the user to input the data quickly to avoid the erasure of video data on the dash camera 272.

At operation 520, process 500 can receive video data and any other information transmitted by the user, the application 260, and/or user device 205, and store the data in one or more of the video data 284 and the case files 286 (FIG. 2). Process 500 can then end.

Figure 6:
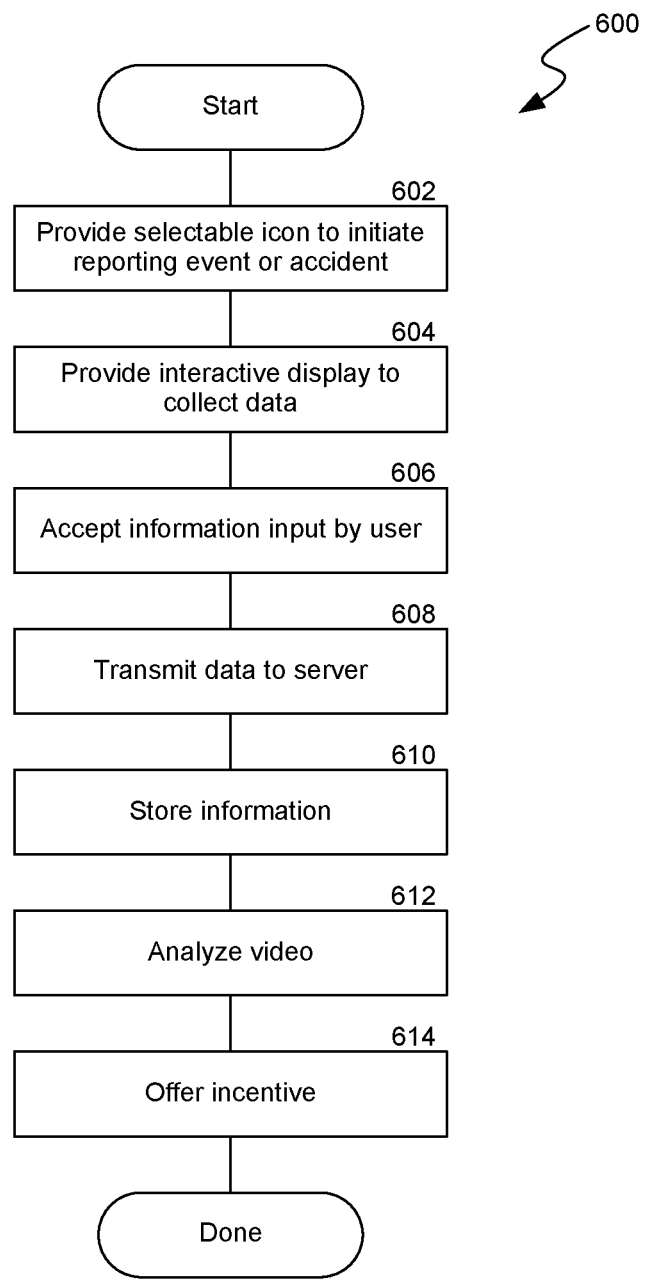
FIG. 6 is a flow diagram illustrating a process for using an application on a user device to upload information and video data associated with an event in accordance with embodiments of the present technology.

FIG. 6 is a flow diagram illustrating a process 600 used in some implementations for using the application 260 on the user device 205 (as shown in FIG. 2) to upload information and video data associated with an event in accordance with embodiments of the present technology. For example, the user may be involved in an event or witness an event and have information and/or video data that may be helpful in determining the circumstances associated with the event. In some cases, the user device 205 may be enrolled in a program that electronically tracks the user device 205 via GPS 262 and/or tracks the user's vehicle 270 via telematics. The user may or may not be a member of the enterprise 212.

At operation 602, process 600 can present a selectable icon to initiate reporting an event or accident information. At operation 604, process 600 can present, such as with an interactive display, questions, checklists, and/or fillable data windows to accept information input by the user. In some cases, additional selectable icon(s) and/or fillable form(s) can be provided.

At operation 606, process 600 can accept information input by the user. In some cases, process 600 may request a user statement of the event that can be input via text, verbally, and/or with video. For example, the user can input the location and time of the event. The user may, in some cases, be asked to specify on a map the location of the event. In some embodiments, process 600 can accept one or more of: video data from the user device 205, video data from another electronic device, video data from a dash camera 272, a web address of a posted video, a statement (text, audio, and/or video), event location data such as map data, etc.

At operation 608, process 600 can transmit the data to the server 210. In some cases, the data is transmitted to the server 210 in real-time or near real-time as the data is entered.

At operation 610, process 600 can save the information in the database 215, such as in the video data 284 and case files 286. In some cases, a new case file may be generated and stored in the case files 286.

At operation 612, any uploaded or identified video data can be analyzed or requested. For example, machine learning can be used to analyze the video data as previously discussed (see, e.g., operation 418 of FIG. 4). Also, metadata stored with the video data can be analyzed for GPS/time correlation with the reported event or accident.

At operation 614, process 600 can offer and/or provide an incentive to the user for providing the information. In some embodiments, the incentive may be offered only when the video data and/or statements correlate with a confirmed event or accident. In other embodiments, the video data and/or statements may be made available to other entities, such as the fleet-based business 234 or business 224. For example, the fleet-based business 234 and/or business 224 may search the database 215 of the enterprise 212 for a match with one of their events. In some cases, an entity other than the enterprise 212 may offer the user an incentive, or authorize the enterprise 212 to offer the user an incentive, when a match with an event is identified.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

What is claimed is:

1. A method for requesting video data associated with an event, the method comprising:
    determining an event location and an event time associated with the event;
    identifying A) a geographic range associated with the event location and B) a time duration associated with the event time;
    generating query parameters for querying meta-data associated with video data stored in at least two video storage sources; and
    automatically querying the at least two video storage sources, using the query parameters, to obtain video files that correspond to the geographic range and the time duration,
    wherein the video files comprise video data associated with the event,
    wherein a first video storage source of the at least two video storage sources includes at least video data acquired by cameras associated with vehicles, and
    wherein a second video storage source of the at least two video storage sources is a publicly available video aggregator of videos posted by a plurality of entities.

2. The method of claim 1, further comprising:
    receiving, from a dash camera installed in a vehicle, global positioning system (GPS) tracking data associated with at least one user; and
    storing the tracking data in association with timing data.

3. The method of claim 1, further comprising:
    determining that an initial query did not provide the video data depicting the event and in response:
    identifying the geographic range by increasing a previously determined geographic range or identifying the time duration by increasing a previously determined time duration.

4. The method of claim 1, further comprising:
    identifying, in the video files by applying one or more machine learning models, that the video data can be used to identify a vehicle rate of speed, weather conditions, presence of an obstacle, or any combination thereof, in relation to the event.

5. The method of claim 1, wherein the at least two video storage sources include a storage that receives video data recorded by a plurality of fleet vehicles, the fleet vehicles including GPS tracking devices and dash cameras, which provide the video data and corresponding location data.

6. The method of claim 1, wherein the event location and the event time are determined based on telematics from a vehicle associated with the event.

7. The method of claim 1, wherein the event location and the event time were specified, in a user interface, by at least one user.

8. A non-transitory computer-readable storage medium storing instructions that, when executed by a computing system, cause the computing system to perform a process for requesting video data associated with an event, the process comprising:
    determining an event location and an event time associated with the event;
    identifying A) a geographic range associated with the event location and B) a time duration associated with the event time; and
    automatically querying the at least two video storage sources to obtain video files that correspond to the geographic range and the time duration,
    wherein the video files comprise video data associated with the event,
    wherein a first video storage source of the at least two video storage sources includes at least video data acquired by cameras associated with vehicles, and
    wherein a second video storage source of the at least two video storage sources is a publicly available video aggregator of videos posted by a plurality of entities.

9. The non-transitory computer-readable medium of claim 8, wherein the process further comprises:
    receiving, from a dash camera installed in a vehicle, global positioning system (GPS) tracking data associated with at least one user; and
    storing the tracking data in association with timing data.

10. The non-transitory computer-readable medium of claim 8, wherein the process further comprises:
    determining that an initial query did not provide the video data depicting the event and in response:
    identifying the geographic range by increasing a previously determined geographic range or identifying the time duration by increasing a previously determined time duration.

11. The non-transitory computer-readable medium of claim 8, wherein the process further comprises:
    identifying, in the video files by applying one or more machine learning models, that the video data can be used to identify a vehicle rate of speed, presence of an obstacle, or any combination thereof, in relation to the event.

12. The non-transitory computer-readable medium of claim 8, wherein the at least two video storage sources include a storage that receives video data recorded by a plurality of fleet vehicles, the fleet vehicles including GPS tracking devices and dash cameras, which provide the video data and corresponding location data.

13. The non-transitory computer-readable medium of claim 8, wherein the event location and the event time are determined based on telematics from a vehicle associated with the event.

14. The non-transitory computer-readable medium of claim 8, wherein the event location and the event time were specified, in a user interface, by at least one user.

15. A computing system for requesting video data associated with an event, the computing system comprising:
    one or more processors; and
    one or more memories storing instructions that, when executed by the one or more processors, cause the system to perform a process comprising:
        determining an event location and an event time associated with the event;
        identifying A) a geographic range associated with the event location and B) a time duration associated with the event time; and
        automatically querying at least two video storage sources to obtain video files that correspond to the geographic range and the time duration,
        wherein a first video storage source of the at least two video storage sources includes at least video data acquired by cameras associated with vehicles, and
        wherein a second video storage source of the at least two video storage sources is a publicly available video aggregator of videos posted by one or more entities.

16. The computing system according to claim 15, wherein the process further comprises:
    receiving, from a dash camera installed in a vehicle, global positioning system (GPS) tracking data associated with at least one user; and
    storing the tracking data in association with timing data.

17. The computing system according to claim 15, wherein the process further comprises:
    determining that an initial query did not provide the video data depicting the event and in response:
    identifying the geographic range by increasing a previously determined geographic range or identifying the time duration by increasing a previously determined time duration.

18. The computing system according to claim 15, wherein the process further comprises:
    identifying, in the video files by applying one or more machine learning models, that the video data can be used to identify a vehicle rate of speed in relation to the event.

19. The computing system according to claim 15, wherein the at least two video storage sources include a storage that receives video data recorded by a plurality of fleet vehicles, the fleet vehicles including GPS tracking devices and dash cameras, which provide the video data and corresponding location data.

20. The computing system according to claim 15, wherein the event location and the event time are determined based on telematics from a vehicle associated with the event.

* * * * *